United States Patent Office 3,139,685
Patented July 7, 1964

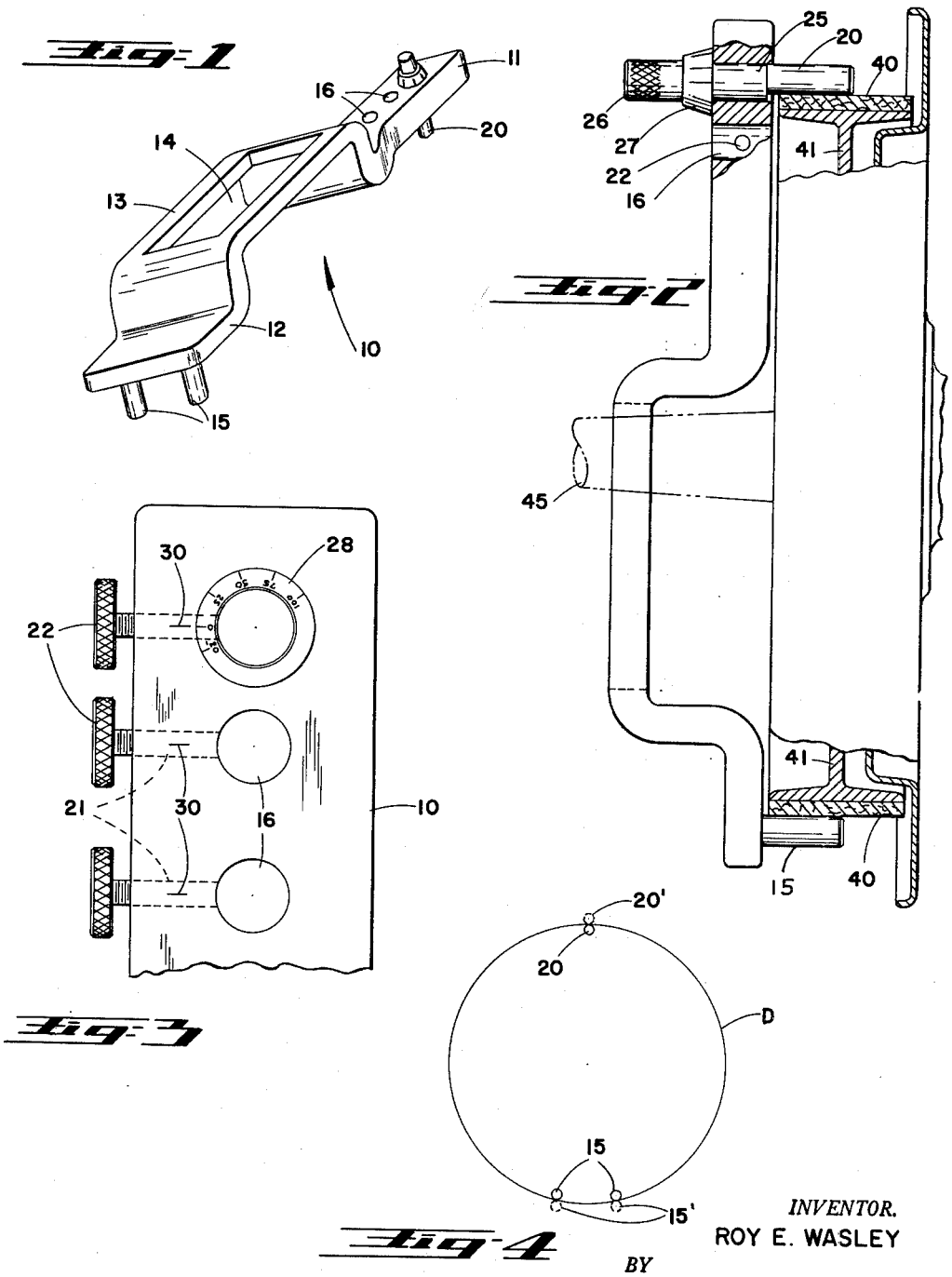

3,139,685
BRAKE GAUGE
Roy E. Wasley, San Carlos, Calif.
(9136 NE. Glisan St., Portland, Oreg.)
Filed Mar. 28, 1961, Ser. No. 98,859
1 Claim. (Cl. 33—178)

This invention relates to a gauge for use in adjusting automobile brake shoes to fit the brake drums with proper clearance therearound.

Most automobile brakes are of the internal expanding arcuate shoe type wherein friction linings on the shoes are brought to bear against the cylindrical inner surface of a brake drum attached to the wheel. When the brake shoes are relined it is customary to true the drums at the same time whereby some metal is removed from the braking surface of the drum giving it a slightly larger inside diameter. The new linings on the shoes are then ground to an arcuate contour having the same radius as the reconditioned drum surface so that the lining on each shoe will exactly fit the surface of the drum.

In order to obtain this result in practice, however, it is necessary to adjust the mounting means for the shoes so that the surface of the lining will assume a relaxed or repose position at the proper distance from the surface of the drum to provide an adequate but not excessive running clearance. If this clearance is too small there is danger of the linings dragging on the drum when the brakes are not intended to be applied and, when the clearance is too great, there is excessive movement of the shoes in applying the brakes. This results in unnecessary and, possibly, objectionable pedal movement and also lack of concentricity of the brake shoes whereby only a portion of the length of the lining on each shoe is brought to bear against the drum. The purpose of the present device is to simplify and facilitate the adjustment of the shoes to provide the proper clearance so that the linings will not drag in relaxed position and so that the whole length of the lining on each shoe will bear against the drum when the shoes are actuated to apply braking effort.

The general object of the present invention is therefore to provide an improved unitary tool for gauging both a brake drum and a set of shoes to fit the drum, to provide a tool of the type described which will gauge drums and shoes quickly and efficiently without requiring a high degree of skill in the operator and to provide such a tool which is relatively simple and inexpensive to manufacture and which is rugged and durable and does not involve a delicate calipering mechanism.

The foregoing and other objects and advantages will become apparent and the invention will be more fully understood from the following description of a preferred embodiment illustrated in the accompanying drawing. Various changes may be made, however, in the construction and arrangement of parts and all such modifications within the scope of the appended claim are included in the invention.

In the drawing:

FIGURE 1 is a perspective view of the present brake gauge;

FIGURE 2 is a view with parts broken away showing the use of the gauge on the brake shoes of an automobile;

FIGURE 3 is an enlarged fragmentary view of a portion of the gauge; and

FIGURE 4 is a diagram illustrating the geometry of the measurements which are obtained by the gauge.

The present gauge comprises a bar with perpendicular gauge pins in its ends to make diametral measurements. One of the gauge pins is equipped with a micrometer scale and is eccentrically rotatable in one or another of a series of holes in one end portion of the bar. The gauge pins are adapted to caliper the inside diameter of a drum and then by transferring the one pin to a different hole, the inside measurement may be converted into an outside measurement, plus clearance space, for adjustment of the shoes.

The gauge, designated generally by the numeral 10, comprises an elongated metal bar having flat end portions 11 and 12 offset in a common plane from an intermediate portion 13 which is provided with a large opening 14. Rigidly mounted in the end 12 is a pair of perpendicular cylindrical gauge pins 15. The end portion 11 is provided with a series of cylindrical holes 16 for mounting a third cylindrical gauge pin 20. In the present embodiment the centers of the holes 16 are on a straight line perpendicular to the midpoint of an imaginary base line connecting the centers of the two pins 15. One edge of the bar is provided with tapped holes 21 intersecting the holes 16 to receive setscrews 22.

Gauge pin 20 has a cylindrical bearing portion 25 to fit the holes 16 and a knob or handle end 26 for rotating the pin in the holes. A flange or collar 27 on the handle is equipped with a scale 28 to be read on an adjacent index mark 30 on the bar. This gauge pin is readily removable from the holes 16 so that it may be transferred from one hole to another.

The gauging portion of pin 20 is slightly smaller in diameter than its bearing portion 25 and is eccentric to the bearing portion whereby rotation of the pin by its handle 26 will cause the pin to move toward and away from the gauge pins 15. For adjusting automobile brakes this range of movement is preferably about .120 inch. The scale 28 is so related to the pin 20 that when the pin 20 is closest to the pins 15, the reading will be −20 and when the pin 20 is turned to its position most remote from the pins 15, the reading will be +100. Thus the +100 mark is diametrically opposite the −20 mark, the numbers designating thousandths of an inch.

Referring now to FIGURE 4, the circle D represents the inner surface of the brake drum. In most automobiles the brake drums are an even number of inches in diameter such as 8, 9, 10, 11 or 12 inches, depending upon the size of the wheel. The brake drum is gauged by placing the pins 15 in contact with one side of its inner surface and then rotating the pin 20 until it contacts the opposite side of the inner surface, as shown. The outer or remote surface portions of the gauge pins contact the drum. Holes 16 are so located that pin 20 will contact the surface of an accurately made drum in new condition when the pin is in the proper hole 16 and the zero mark on scale 28 is at the index line 30. The minus portion of scale 28 allows clearance for inserting the gauge pins in the drum and also allows for manufacturing tolerance whereby some drums are slightly smaller than their nominal diameter. On the other hand, after a drum has been turned in a lathe to true its braking surface, it will ordinarily have an inside diameter slightly larger than its nominal size.

It is convenient to make the three gauge pins 15, 15 and 20 one-half inch in diameter and, in such case, the centers of the holes 16 are spaced apart one inch. Then, when gauge pin 20 is moved out to the next hole and held at the same setting on scale 28, the inside or near surface portions of the three gauge pins will contact the circle D with the gauge pins in the new positions indicated at 15' and 20'. This results from the fact that the distance between the centers of holes 16 is equal to twice the thickness of the pins. The gauge is thereby converted from an inside caliper to an outside caliper by merely shifting the gauge pin 20 from one hole to another. The provision of two pins 15 makes the bar always assume a diametral position automatically without requiring particular care by the operator as is usually necessary with conventional gauges and calipers.

The advantage of making the gauge pins one-half inch in diameter and spacing the holes 16 one inch on centers is that each hole intermediate the two end holes serves the double function of gauging a drum of one size and a shoe assembly of one inch smaller size in diameter, whereby the number of holes is minimized so that they do not overlap.

A slight error is introduced by reason of the fact that the pins 15 do not move out in radial directions to their new positions at 15' but, in practice, this error may be disregarded if the distance between the pins 15 is small in relation to the diameter of the drum.

As a practical example of the use and application of the gauge, let it be assumed that the brake shoe assembly in FIGURE 2 is used in a brake drum D of 12 inch nominal size. Then, when gauge pin 20 is inserted in the second hole from the end of the gauge bar, the three gauge pins will fit within the drum as shown at 15 and 20 in FIGURE 4. When the micrometer reading has been noted on scale 28, the gauge is removed from the drum and gauge pin 20 is transferred to the outermost hole in the gauge bar. Before tightening setscrew 22 the scale 28 is turned to increase the gauge distance by twice the clearance space desired between the brake linings and drum. If .010 inch radial clearance is desired, pin 20 will be turned to increase the reading by the amount of .020 inch. Then the three gauge pins are applied over the surfaces of the linings 40 as shown in FIGURE 2 and the mountings of the shoes 41 are adjusted outward until the linings contact the gauge pins. In making this adjustment, the gauge bar is shifted to different diametral positions about the axis of the shoe assembly. When the brake drum is mounted over the shoes, the linings 40 will then have the desired uniform clearance all around the drum.

Thus, the two outer holes 16 are utilized in gauging 12 inch brakes and additional holes may be provided on one inch centers for 11 and 10 inch brakes, etc. The number of these nominal sizes that can be gauged with a single tool is one less than the number of holes 16.

For gauging shoe and drum assemblies of some diameter intermediate the standard diameters mentioned, a sleeve of appropriate thickness may be inserted over the pin 20 or a pair of such sleeves may be applied to the pins 15. For example, the present tool may be used on 9½ inch brake assemblies by applying a sleeve of one-half inch wall thickness to the pin 20 and then using the pin in the holes provided for 10 inch assemblies.

The purpose of the opening 14 is to accommodate a projecting wheel spindle or axle end 45. The offset central portion 13 of the bar is provided to clear the studs and flanged ends on some axles. With these features the same tool will gauge different sizes of brake assemblies on different spindle and axle arrangements so that a different tool is not necessary for each different size and axle combination. The lower limit in the range of sizes is determined by the position of the offset between central portion 13 and end portion 11, which limits the length of end portion 11 available for the holes 16.

The present form of construction provides the requisite accuracy in a relatively simple and inexpenseive tool which is easy to use by the average garage mechanic. An important advantage is the considerable saving in time and avoidance of errors in performing the two gauging operations incidental to a first class brake adjustment on new linings and re-conditioned drums. At the same time the micrometer calipering device does not include delicate mechanism subject to damage from rough handling and jostling with other garage tools.

Having now described my invention and in what manner the same may be used, what I claim as new and desire to protect by Letters Patent is:

A brake gauge for gauging the adjustment of automobile brake shoe assemblies to fit with predetermined clearance in brake drums in either new or worn condition, comprising a divided elongated body member having a pair of parallel leg portions with an opening therebetween to straddle a projecting axle spindle in diametral position on a shoe assembly associated with said axle, a perpendicular gauge pin fixedly mounted on one end of said body member, a calibrated rotatable eccentric perpendicular gauge pin movable to a plurality of predetermined positions along the other end of said body member, confronting sides of said gauge pins forming an outside caliper for the shoes and the opposite sides forming an inside caliper for the drum, and mechanical indexing means on said body member to locate said eccentric pin in said positions, said positions being spaced apart equal distances from each other in accordance with the uniform increment of size variation of standard brake drums and spaced from said fixed gauge pin distances corresponding to the diameters of the standard sizes of brake drums, the sum of the thicknesses of the two gauge pins being equal to said spacing of said positions so that an inside diameter measurement in a brake drum with the eccentric pin at one of said positions corresponds to an outside diameter measurement on a mating brake shoe assembly with the eccentric pin in the next outer of said positions, and rotation of said eccentric pin in the brake shoe measurement introduces clearance space between the drum and brake shoes in terms of diametral measurement.

References Cited in the file of this patent

UNITED STATES PATENTS

| | | |
|---|---|---|
| 1,888,416 | Williams | Nov. 22, 1932 |
| 2,553,525 | Burke et al. | May 15, 1951 |
| 3,006,076 | Wisti | Oct. 31, 1961 |